United States Patent [19]

Markusch et al.

[11] 4,383,070
[45] May 10, 1983

[54] STORAGE STABLE POLYURETHANE COMPOSITIONS

[75] Inventors: Peter H. Markusch, McMurray, Pa.; Terry A. Potter, New Martinsville, W. Va.; Kenneth P. Yonek, McMurray; James W. Rosthauser, Imperial, both of Pa.

[73] Assignee: Mobay Chemical Corporation, Pittsburgh, Pa.

[21] Appl. No.: 382,509

[22] Filed: May 27, 1982

[51] Int. Cl.³ .............................................. C08G 18/50
[52] U.S. Cl. ................................... 524/317; 524/441; 524/590; 524/759; 524/786; 524/874; 528/67; 528/69; 528/77; 528/78
[58] Field of Search ............... 524/317, 441, 590, 672, 524/759, 786, 874; 528/67, 69, 77, 78

[56] References Cited

U.S. PATENT DOCUMENTS 3,792,023  2/1974  Havenith et al. ............ 260/77.5 AQ
4,118,411 10/1978  Reiff et al. ..................... 260/453 SP
4,292,350  9/1981  Kubitza et al. .................. 427/385.5

Primary Examiner—Maurice J. Welsh
Attorney, Agent, or Firm—Gene Harsh; Lawrence S. Pope; Thomas W. Roy

[57] ABSTRACT

The present invention is directed to an organic polyurethane composition having a solids content of about 10 to 100 weight percent which comprises (1) isocyanate-terminated prepolymers which are prepared by reacting reaction products of the phosgenation of aniline-formaldehyde condensates containing specific ratios of isomers and homologues with polyether polyols containing at least two hydroxyl groups and at least one tertiary nitrogen atom and, optionally, an additional polyol which does not contain a tertiary nitrogen atom and optionally, (2) a monoisocyanate comprising a member selected from para-toluenesulfonyl isocyanate and the reaction product of 2,4- or 2,6-toluene diisocyanate or mixtures thereof with specific monoalcohols.

The present invention is also directed to the coatings produced from the polyurethane compositions, optionally containing pigments.

16 Claims, No Drawings

STORAGE STABLE POLYURETHANE COMPOSITIONS

BACKGROUND OF THE INVENTION

1. Field of the Invention

The present invention relates to polyurethane compositions which are soluble in organic solvents and harden to form insoluble coatings through the reaction of isocyanate groups.

2. Description of the Prior Art

Polyurethanes which cure through the reaction of terminal isocyanate groups are known. For example, U.S. Pat. No. 4,118,411 discloses diisocyanates based on the reaction product of glycols with diphenylmethane diisocyanate isomers in specific ratios. The diisocyanate products are suitable for the production of elastomers or foams.

Polyurethanes having terminal isocyanate groups which cure by reaction with moisture are also known. British Pat. No. 1,294,017 discloses the use of polyurethanes as binders in synthetic resin concretes. The active hydrogen component of the polyurethane is based on polyether polyols while the isocyanate component is based on toluene diisocyanate isomers or the isomers and higher homologues produced by the phosgenation of aniline-formaldehyde condensates. Note particularly Example 2.

U.S. Pat. No. 4,292,350 discloses polyurethane compositions based on specific monoisocyanates and polyisocyanates which contain an average of more than two isocyanate groups per molecule. These compositions may be applied by spraying with subsequent curing by moisture.

U.S. Pat. No. 3,792,023 is directed to one-component isocyanate-terminated polyurethanes prepared from aromatic diisocyanates and polyols, one of the polyols containing a tertiary nitrogen atom. These polyurethanes are not only stable in storage, but also dry quickly into coatings when exposed to atmospheric moisture through reaction of their terminal isocyanate groups. While these systems have found acceptance by virtue of this surprising combination of properties, they still suffer from several disadvantages.

Initially, it is difficult to formulate these polyurethanes in solvent blends which are not regulated by the government, e.g. California's Rule 66, without a reduction in properties. Secondly, these polyurethane systems cannot be formulated at high solids levels, and finally, coatings prepared from these systems must be applied in thin layers to prevent entrapment of bubbles which are formed from the reaction of the isocyanate groups with moisture. The bubbles are trapped when the surface of the coating reacts to form a skin which prevents the bubbles formed beneath the surface from escaping.

Accordingly, it is an object of the present invention to provide storage stable polyurethane compositions which can be formulated in nonregulated solvents at high solids contents.

It is an additional object to provide polyurethanes whose terminal isocyanate groups react with moisture to form coatings without the entrapment of bubbles.

It is a final object of the present invention to provide one-component polyurethanes which are compatible with pigments and also meet the above objectives.

It has now been found that these objectives can be achieved with a composition which contains isocyanate-terminated polyurethanes based on specific products of the aniline-formaldehyde condensation reaction and, optionally, specific monoisocyanates.

SUMMARY OF THE INVENTION

The present invention is directed to an organic polyurethane composition having a solids content of about 10 to 100 weight percent which comprises (1) isocyanate-terminated polyurethanes which are prepared by reacting (a) reaction products of the phosgenation of aniline-formaldehyde condensates containing, based on the total weight of component (a), (i) about 0 to 10 weight percent of 2,2'-diphenylmethane diisocyanate, (ii) about 10 to 40 weight percent of 2,4'-diphenylmethane diisocyanate, (iii) about 30 to 60 weight percent of 4,4'-diphenylmethane diisocyanate and (iv) about 25 to 60 weight percent of polymeric isocyanates having 3 or more isocyanate groups; with (b) a polyol component comprising (i) a polyether polyol with an average molecular weight of less than about 10,000 and which contains at least two hydroxyl groups and at least one tertiary nitrogen atom and which has at least 5 ether groups between the tertiary nitrogen atom and the hydroxyl groups, and optionally (ii) an additional polyol which contains at least two hydroxyl groups and does not contain a tertiary nitrogen atom, wherein the polyol component (b) contains about 20 to 100 weight percent of component (i) and about 0 to 80 weight percent of component (ii) and wherein the quantities of (a) and (b) are chosen to provide component (1) with an isocyanate content of about 5 to 30 weight percent based on the total weight of component (1) and a viscosity of about 2,500 to 6,500 cps; and, optionally, (2) a monoisocyanate comprising a member selected from the group consisting of para-toluenesulfonyl isocyanate and the reaction product of 2,4-toluene diisocyanate or 2,6-toluene diisocyanate with an alcohol of the formula $R_1OH$ wherein $R_1$ represents a hydrocarbon group having from 1–18 carbon atoms optionally interrupted by ether groups, wherein up to about 50% by weight of component (2) is used based on the weight of component (1).

The present invention is also directed to the coatings produced from the polyurethane compositions, optionally containing pigments.

DETAILED DESCRIPTION OF THE INVENTION

Suitable isocyanate components to be used for the preparation of the isocyanate-terminated polyurethanes of the present invention are specific phosgenation products of the aniline-formaldehyde condensation reaction, i.e. those which contain about 10 to 40 weight percent of 2,4'-diphenylmethane diisocyanate. The remainder of the mixture contains about 0 to 10 weight percent of 2,2'-diphenylmethane diisocyanate, about 30 to 60 weight percent of 4,4'-diphenylmethane diisocyanate and about 25 to 60 weight percent of polymeric isocyanates containing 3 or more isocyanate groups.

When component (2), i.e. the monoisocyanate, is present a preferred mixture of the phosgenation products of the aniline-formaldehyde condensation reaction has the following composition:

(i) about 0 to 5 weight percent of 2,2'-diphenylmethane diisocyanate, (ii) about 15 to 30, most preferably about 20 to 30, weight percent of 2,4'-diphenylmethane diisocyanate, (iii) about 35 to 50 weight percent of 4,4'-diphenylmethane diisocyanate, and (iv) about 30 to 45 weight percent of polymeric isocyanates containing 3 or more isocyanate groups.

In the absence of the component (2) monoisocyanate a preferred mixture of the phosgenation products of the aniline-formaldehyde condensation reaction has the following composition:

(i) about 0 to 5 weight percent of 2,2'-diphenylmethane diisocyanate, (ii) about 20 to 30 weight percent of 2,4'-diphenylmethane diisocyanate, (iii) about 35 to 50 weight percent of 4,4'-diphenylmethane diisocyanate, and (iv) about 30 to 45 weight percent of polymeric isocyanates containing 3 or more isocyanate groups.

Suitable methods of preparing both the broadly defined and preferred mixtures are disclosed in U.S. Pat. Nos. 3,277,173 and 3,362,979.

It is also possible to use the above mixtures in a partially carbodiimidized form. The carbodiimidization reaction is preferably conducted in the absence of the polymeric isocyanate component by reacting only the diisocyanate components of the above mixture. The polymeric isocyanates may be separated from the diisocyanates by distillation. After the diisocyanate mixture has been partially carbodiimidized, the polymeric isocyanates may be reblended therewith in order to obtain an overall isocyanate mixture which is suitable for use in accordance with the subject invention. Methods of carrying out the carbodiimidization process are disclosed in U.S. Pat. No. 4,154,752.

In the practice of the invention polyether alcohols that contain a tertiary nitrogen atom and have at least five and preferably ten ether groups between the reactive hydroxyl groups and the nitrogen atom can be used as the hydroxyl containing compound.

Some such suitable hydroxyl compounds include the alkoxylation products of ammonia and aliphatic amines which have from one to three nitrogen atoms in the molecule and at least two, but preferably three or four hydrogen atoms bound to nitrogen atoms, and in which one or more nitrogen atoms may also form a part of a heterocyclic ring. The alkoxylating reactant is preferably an epoxide having 2-4 carbon atoms. The alkoxylation products of hydrazine and aliphatic mono- or dihydrazines containing at least two hydrogen atoms bound to a nitrogen atom may also be used.

Some specific examples include the ethoxylation, propoxylation and butoxylation products of butyl amine, cyclohexyl amine, piperazine, ethylene diamine, N,N'-dimethyl ethylene diamine, stearyl amine, methyl-bis-(3-aminopropyl)-amine, methylhydrazine and symmetrical and asymmetrical dimethyl hydrazine.

The nitrogen-containing hydroxyl compounds used in the practice of this invention should have an average molecular weight of less than about 10,000. It is preferred to use polyalcohols having an average molecular weight of from about 1000 to 5000.

The polyol component may also partially include polyols which contain 2 or more hydroxyl groups and which do not contain a tertiary nitrogen. Suitable polyols of this type include the polyether and polyester polyols known in polyurethane chemistry. The preferred polyols are the polyether polyols which may be prepared by the alkoxylation of di- or poly-hydroxy alcohols. Suitable examples are polyethylene glycol, polypropylene glycol or polybutylene glycol with polypropylene glycol being particularly preferred.

The average molecular weight of the tertiary nitrogen-free polyols should also be less than about 10,000 and preferably from about 1,000 to 5,000.

The total polyol component should contain between about 20 and 100, preferably 40 to 60 weight percent of the polyol containing a tertiary nitrogen atom and about 0 to 80, preferably about 40 to 60 weight percent of the polyol which does not contain a tertiary nitrogen atom.

The isocyanate-terminated polyurethanes may be prepared with or without a solvent by simply charging the isocyanate component with stirring to a dry reaction vessel followed by the addition of the polyol component. The use of a solvent is less preferred since they must be thoroughly dried prior to use to avoid the presence of moisture. The reaction vessel is preferably blanketed with nitrogen or any suitable inert gas. The reaction may be carried out at a temperature between about 20° and 120° C., preferably between about 60° and 100° C. until the measured isocyanate content approaches or is found to be slightly below the theoretical value. The isocyanate and polyol components should be used in quantities which will provide a final product containing from about 5 to 30, preferably from about 10 to 20 weight percent of isocyanate groups based on the total weight of the isocyanate-terminated polyurethanes. Accordingly, when the isocyanate component is partially carbodiimidized, the quantity of the polyol component to be used will generally be less than when the isocyanate component is not partially carbodiimidized in order to achieve the required isocyanate content.

The monisocyanate which may optionally be used in conjunction with the isocyanate-terminated polyurethanes may either be para-toluenesulfonyl isocyanate or the reaction product of 2,4- or 2,6-toluene diisocyanate or mixtures thereof, the 2,4-isomer being preferred, with an alcohol of the formula $R_1OH$ wherein $R_1$ represents a hydrocarbon group having from 1 to 18 carbon atoms, optionally interrupted by ether bridges. $R_1$ preferably represents a saturated aliphatic hydrocarbon group having from 6 to 12 carbon atoms optionally interrupted by ether oxygen atoms, in particular a saturated aliphatic hydrocarbon group having from 6 to 12 carbon atoms and a branched carbon chain.

These monoisocyanates can be prepared by a simple process of reacting excess quantities of the toluene diisocyanate isomer or isomer mixture with the hydroxyl compound followed by removal of unreacted excess diisocyanate by distillation, for example in a thin layer evaporator.

The following are examples of suitable hydroxyl compounds $R_1$—OH: methanol, ethanol, i-propanol, i-butanol, n-dodecanol, n-octadecanol, ethoxyethanol, ethoxy-ethoxyethanol, propoxyethanol, and cyclohexanol; branched chain alcohols such as neopentyl alcohol, 2-ethylhexanol or the isomeric trimethylhexanols being particularly preferred.

The diisocyanates and alcohols used for the preparation of the monoisocyanates are preferably chosen so that the reaction products are low viscosity monoisocyanates which are liquid at room temperature.

The polyurethane compositions of the present invention are prepared by mixing the isocyanate-terminated polyurethane component and the monoisocyanate component in a suitable solvent such as an ester, ketone or chlorinated hydrocarbon having a water content of less than about 0.1 weight percent, preferably less than about 0.05 weight percent. Suitable solvents are methylene chloride, trichloroethylene, toluene, xylene, ethyl acetate, propyl acetate, butyl acetate, amyl acetate, isobutyl acetate, methyl ethyl ketone, methyl isobutyl ketone, methoxybutyl acetate, ethylene glycol monoethyl ether acetate and mixtures thereof. Preferred solvents are those which are not photochemically reactive as set forth in Rule 66 of the California Air Pollution Code such as cyclohexane, cyclohexanone, dichlorobenzene, diethyl ketone, diisobutyl ketone, dioxane, ethyl acetate, ethyl n-amyl ketone, ethyl n-butyl ketone, ethylene dichloride, ethylene glycol monobutyl ether acetate, ethylene glycol monoethyl ether acetate, ethylene glycol monomethyl ether acetate, 2-ethylhexyl acetate, glycol diacetate, heptane, hexane, isobutyl acetate, isobutyl isobutyrate, isooctane, isopropyl acetate, methyl acetate, methyl amyl acetate, methyl-butyl ketone, methyl chloroform, methyl chloride, methyl ethyl ketone, methyl n-heptyl ketone, methyl isoamyl ketone, methyl n-propyl ketone, mineral spirits, monochlorobenzene, 2-nitropropane, orthodichlorobenzene, perchloroethylene, n-propyl acetate, tetrahydrofuran, tetrachloroethylene, 1,1,1-trichloroethane, trichlorofluoromethane and mixtures thereof. A particularly preferred solvent combination is a 2 to 1 mixture by weight of ethylene glycol monobutyl ether acetate and mineral spirits.

The solids content of the polyurethane composition is between about 10 and 100, preferably about 50 to 90 weight percent when clear coatings are desired. If pigments are included in the composition, then the solids content is between about 30 to 90, preferably about 50 to 80 weight percent. Generally, up to about 50% by weight of the monoisocyanate component is used based on the weight of the isocyanate-terminated polyurethane component. Preferably the weight ratio of the isocyanate-terminated polyurethane component to the monoisocyanate component is about 20:1 to 2:1 and most preferably about 15:1 to 8:1.

The polyurethane compositions are ideally suited for the production of clear and pigmented coatings since they are storage stable and possess good reactivity. Additionally, the compositions may be formulated at high solids contents in solvents which are not photochemically reactive. Coatings produced from these compositions possess good through cure characteristics and do not contain entrapped bubbles when applied at high thicknesses.

The end products of the process are suitable for coating and impregnating woven and nonwoven textiles, leather, paper, wood, metals, ceramics, stone, concrete, bitumen, hard fibers and plastics of a variety of different types; as binders for nonwovens, adhesives, adhesion promoters, laminating agents, hydrophobizing agents and plasticizers; additionally as binders for sawdust, glass fibers, asbestos, paper-like materials and plastics or rubber waste; and as auxiliaries in textile printing and in the paper industry.

The properties of the end products may be modified by using active and inactive fillers such as carbon black, silica, asbestos, talcum, kaolin, titanium dioxide, cellulose and glass in the form of powder or in the form of fibers. Depending upon the required property spectrum and the application envisaged for the end products, up to about 70%, based on total dry substance, of these fillers may be present in the end product. Dyes or additives which influence flow properties may, of course, also be added.

Drying of the products obtained by various application techniques may be carried out either at room temperature or at elevated temperature. The drying temperature to be selected in each individual case, which is governed not only by the chemical compositions of the material, but above all by its moisture content, the drying time and the layer thickness, is readily determined by a preliminary test.

Extremely hard polyurethanes obtained from these products are suitable for use as stoving lacquers and as air-drying lacquers. They combine extreme hardness and elasticity with high gloss and weather resistance.

Business machine housings which are made from plastic materials are another important application for these products. Additionally, they are excellently suited to coat bowling alleys, as chip resistance coatings in automotive applications, for furniture, aircraft, foil and paper.

The clear compositions are outstanding materials for moisture-curing formulations used to prime and seal porous substrates, such as cement. The coating will prevent spalling and increase the chemical resistance of the concrete substrate.

With aluminum pigmentation these compositions have given excellent results as a primer. The ability of such a coating to adhere to various substrates has been excellent. These substrates include urethane foam insulation, weathered galvanized steel, wood and lightly rusted ferrous metal with little or no surface preparation. However, loose rust should be removed for best results.

Coatings, pigmented with aluminum, can also be considered as a general maintenance-type coating for year-round use. These coatings can be successfully applied at temperatures in the upper teens and lower twenties (°F.) with no difficulty in application or cure of the applied coating.

The invention is further illustrated, but is not intended to be limited by the following examples in which all parts and percentages are by weight unless otherwise specified.

EXAMPLES

Example 1

Preparation of an isocyanate-terminated polyurethane

A dry reaction vessel was charged with 282 parts of a polymeric isocyanate prepared by the phosgenation of an aniline-formaldehyde condensate (NCO content—30.5%, viscosity—100 cps) and containing 3% 2,2'-, 39% 4,4'-, and 23% 2,4'-diphenylmethane diisocyanate and 35% of higher functional polymeric isocyanates. With continuous stirring 100 parts each of polypropylene glycol (average MW 2000, OH no. 56) and polypropylene tetraol (average MW 3600, OH no. 62, prepared by the propoxylation of ethylene diamine) were added to the reaction vessel at room temperature. The mixture was blanketed with dry nitrogen and heated to a temperature of 80°–88° C. The mixture was kept within this temperature range until the measured NCO content was at or slightly below the theoretical value (2–4 hours).

Theoretical NCO content—16%

Measured NCO content—15.8%
Viscosity (25° C.)—5440 cps

Example 2 (Comparison)

Preparation of a prior art isocyanate-terminated polyurethane

An isocyanate-terminated prepolymer was prepared in a manner similar to Example 1 with the exception that the phosgenated aniline-formaldehyde condensate contained less than 0.1% 2,2'-, 47–48% 4,4'-, and 2–3% 2,4'-diphenylmethane diisocyanate and 50% of higher functional polymeric isocyanates.

Theroretical NCO content—about 16%.

Example 3

Preparation of a monoisocyanate

A dry reaction vessel was charged with 4 moles of a mixture of 80 parts 2,4- and 20 parts 2,6-toluene diisocyanate. With continuous stirring 1 mole of 2-ethylhexanol was added and cooling was applied such that the temperature did not exceed 50° C. The mixture was further reacted at a temperature of 50° C. for a period of 3 hours. The excess diisocyanate was removed by vacuum distillation in a thin layer evaporator (140° C., 0.1 mm Hg). The low viscosity monoisocyanate had a viscosity of 540 cps (25° C.), an isocyanate content of 14.0% and a monomeric diisocyanate content of 1.1%.

Example 4

Preparation of polyurethane composition (a) 62 parts of the isocyanate-terminated polyurethane prepared in accordance with Example 1 and 6.9 parts of the monoisocyanate prepared in accordance with Example 3 were blended with 11.5 parts of ethylene glycol monobutyl ether acetate and 5.7 parts mineral spirits to form an organic solution.

Total solids—80%
Viscosity (24° C.)—300 cps (b) The isocyanate-terminated polyurethane prepared in accordance with Example 2 could not be formulated in a 2:1 mixture by weight of ethylene glycol monobutyl ether acetate and mineral spirits to produce a clear solution. Within a few hours after mixing, the mixture of the solvents and the isocyanate-terminated polyurethane separated into two phases. When the polyurethane was formulated in Solvesso 100* at 80% total solids, coatings produced therefrom were marred by bubbling and blistering caused by premature curing of the surface of the coating followed by the release of carbon dioxide beneath the surface.
*a trademark of Exxon for a mixture of aromatic solvents with a boiling point range of 155° to 173° C.

(c) 48.7 parts of the isocyanate-terminated polyurethane prepared in accordance with Example 1 and 5.4 parts of the monoisocyanate prepared in accordance with Example 3 were blended with 27 parts of Alcoa 6269 paste, (a dispersion of aluminum particles in mineral spirits, 65% solids) 8.9 parts ethylene glycol monobutyl ether acetate and 4.4 parts mineral spirits to form an organic solution containing dispersed aluminum particles.

Total solids—75%
Viscosity (24° C.)—600 cps (d) The isocyanate-terminated polyurethane prepared in accordance with Example 2 could not be blended with Alcoa 6269 paste and formulated in a 2:1 mixture by weight of ethylene glycol monobutyl ether acetate and mineral spirits due to the fact that the mixture of the solvents and the polyurethane separated into two phases. When the isocyanate-terminated polyurethane was blended with Alcoa 6269 paste and formulated at 75% total solids in Solvesso 100, coatings produced therefrom were marred by bubbling and blistering caused by premature curing of the surface of the coating followed by release of carbon dioxide beneath the surface.

(e) 41.1 parts of the isocyanate-terminated polyurethane prepared in accordance with Example 2 were blended with 20.5 parts of Alcoa 6269 paste and 29.0 parts of Solvesso 100 to form an organic solution containing dispersed aluminum particles.

Total solids—60%
Viscosity (24° C.)—112 cps

The Gardner dry times were determined for the polyurethane compositions prepared in accordance with Examples 4(a) and 4(c) by preparing films (3 mil WFT on glass) and allowing them to cure under ambient laboratory conditions. The dry times in hours are reported in Table I.

TABLE I

|  | Example 4(a) | Example 4(c) |
|---|---|---|
| Set to touch | 2.0 | 2.0 |
| Surface dry | 5.0 | 7.5 |
| Hard dry | 7.0 | 10.0 |
| Mar free | 14.0 | 14.0 |

The Gardner dry times for Example 4(b) at a solids content of 60% in Solvesso 100 and for Example 4(e) are faster than those for Examples 4(a) and 4(c).

Additional coatings were prepared by spraying the polyurethane compositions prepared in accordance with Examples 4(a), 4(c) and 4(e) onto Bondrite ® 1000 steel panels* (cold rolled steel-flat polished, iron phosphate treated) at a wet film thickness of 3 to 4 mils and evaluated after two weeks of cure time at ambient laboratory conditions. Hardness and impact values for the coatings are listed in Table II while the solvent and chemical resistance values are set forth in Table III.
*a registered trademark of Oxy Metal Industries Corporation

TABLE II

| Coating | Pencil Hardness | Gardner Impact (f/r) | Taber* Abrasion Index |
|---|---|---|---|
| Example 4(a) | 2H-3H | 160/60 in. lbs. | 16.9 |
| Example 4(c) | H-2H | 140/50 in. lbs. | — |
| Example 4(e) | H | 120/60 in lbs. | — |

*Weight loss (mg) per 1000 cycles, CS-17 wheel with 1000 g. load.

TABLE III

| Coating | A. Chemical Resistance (hours to destruction) | | | | | |
|---|---|---|---|---|---|---|
| | 50% NaOH | Aniline | 50% NH₄OH | Acetic Acid | 37% HCl | 50% H₂SO₄ |
| Example 4(a) | >72 | 1 | >72 | 1 | 24 | 72 |
| Example 4(c) | >144 | 24 | >144 | 24 | 6 | >144 |
| Example 4(e) | 48 | 24 | >144 | 24 | 24 | 48 |

TABLE III-continued

| | B. Solvent Resistance (hours to destruction) | | | | |
|---|---|---|---|---|---|
| Coating | Acetone | Ethylene Glycol Monoethyl Ether Acetate | Ethyl Acetate | Xylol | Skydrol* |
| Example 4(a) | >24 | >24 | >24 | >24 | >24 |
| Example 4(c) | 1 | 96 | >96 | 96 | >144 |
| Example 4(e) | 1 | >96 | >96 | >96 | >96 |

*a trademark of Monsanto for a hydraulic fluid

Additional coatings were prepared by spraying the polyurethane compositions prepared in accordance with Examples 4(c) and 4(e) on Bondrite ® 1000 steel panels at a wet film thickness of 6 mils and cured at ambient laboratory conditions. The coating prepared in accordance with the subject invention, i.e. Example 4(c), was non-blistering and bubble-free. The coating prepared in accordance with Example 4(e) contained blisters and bubbles.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An organic polyurethane composition having a solids content of about 10 to 100 weight percent which comprises
    (1) isocyanate-terminated polyurethanes which are prepared by reacting
        (a) reaction products of the phosgenation of aniline-formaldehyde condensates containing, based on the total weight of component (a),
            (i) about 0 to 10 weight percent of 2,2'-diphenylmethane diisocyanate,
            (ii) about 10 to 40 weight percent of 2,4'-diphenylmethane diisocyanate,
            (iii) about 30 to 60 weight percent of 4,4'-diphenylmethane diisocyanate and
            (iv) about 25 to 60 weight percent of polymeric isocyanates having 3 or more isocyanate groups; with
        (b) a polyol component comprising
            (i) a polyether polyol with an average molecular weight of less than about 10,000 and which contains at least two hydroxyl groups and at least one tertiary nitrogen atom and which has at least 5 ether groups between the tertiary nitrogen atom and the hydroxyl groups, and optionally
            (ii) an additional polyol with an average molecular weight of less than about 10,000 and which contains at least two hydroxyl groups and does not contain a tertiary nitrogen atom,
        wherein the polyol component (b) contains about 20 to 100 weight percent of component (i) and about 0 to 80 weight percent of component (ii) and wherein the quantities of (a) and (b) are chosen to provide component (1) with an isocyanate content of about 5 to 30 weight percent based on the total weight of component (1) and a viscosity of about 2,500 to 6,500 cps; and, optionally
    (2) a monoisocyanate comprising a member selected from the group consisting of para-toluene-sulfonyl isocyanate and the reaction product of 2,4-toluene diisocyanate or 2,6-toluene diisocyanate with an alcohol of the formula $R_1OH$ wherein $R_1$ represents a hydrocarbon group having from 1–18 carbon atoms optionally interrupted by ether groups, wherein up to about 50% by weight of component (2) is used based on the weight of component (1).

2. The composition of claim 1 wherein components (a) (i), (a) (ii) and (a) (iii) are present in partially carbodiimidized form.

3. The composition of claim 1 wherein component (a) contains based on the total weight of component (a)
    (i) about 0 to 5 weight percent of 2,2'-diphenylmethane diisocyanate,
    (ii) about 15 to 30 weight percent of 2,4'-diphenylmethane diisocyanate,
    (iii) about 35 to 50 weight percent of 4,4'-diphenylmethane diisocyanate, and
    (iv) about 30 to 45 weight percent of polymeric isocyanates having 3 or more isocyanate groups.

4. The composition of claim 1 or 3 wherein polyol component (b) contains about 40 to 60 weight percent of component (b) (i) and about 40 to 60 weight percent of component (b) (ii), and wherein components (b) (i) and (b) (ii) have an average molecular weight of about 1,000 to 5,000.

5. The composition of claim 1 or 3 wherein component (1) has an isocyanate content of about 10 to 20 weight percent based on the total weight of component (1) and a viscosity of about 4000 to 5500 cps.

6. The composition of claim 1 or 3 wherein the polyurethane composition has a solids content of about 50 to 90 weight percent.

7. The composition of claim 1 or 3 wherein the weight ratio of component (1) to component (2) is about 20:1 to 2:1.

8. The composition of claim 1 or 3 wherein the weight ratio of component (1) to component (2) is between about 15:1 to 8:1.

9. The composition of claim 1 or 3 wherein the composition additionally contains a pigment.

10. The composition of claim 9 wherein the pigment is aluminum.

11. The composition of claim 1 wherein the composition additionally contains a solvent comprising a member selected from the group consisting of ethylene glycol monobutyl ether acetate and mineral spirits.

12. An organic polyurethane composition having a solids content of about 50 to 90 weight percent which comprises
    (1) isocyanate-terminated polyurethanes which are prepared by reacting
        (a) reaction products of the phosgenation of aniline-formaldehyde condensates containing, based on the total weight of component (a),
            (i) about 0 to 5 weight percent of 2,2'-diphenylmethane diisocyanate,
            (ii) about 15 to 30 weight percent of 2,4'-diphenylmethane diisocyanate, (iii) about 35 to 50 weight percent of 4,4'-diphenylmethane diisocyanate and (iv) about 30 to 45 weight percent of polymeric isocyanates having 3 or more isocyanate groups; with (b) a polyol component comprising (i) a polyether polyol with an average molecular weight of about 1,000 to 5,000 and which contains at least two hydroxyl groups and at least one tertiary nitrogen atom and which has at least 10 ether groups between the tertiary nitrogen atom and the hydroxyl groups, and optionally, (ii) an additional polyol with an average molecular weight of about 1,000 to 5,000 and which contains at least two hydroxyl groups and does not contain a tertiary nitrogen atom, wherein the polyol component (b) contains about 40 to 60 weight percent of component (i) and about 40 to 60 weight percent of component (ii) and wherein the quantities of (a) and (b) are chosen to provide component (1) with an isocyanate content of about 10 to 20 weight percent based on the total weight of component (1) and a viscosity of about 4,000 to 5,500 cps; and (2) a liquid monoisocyanate comprising a member selected from the group consisting of para-toluenesulfonyl isocyanate and the reaction product of 2,4-toluene diisocyanate or 2,6-toluene diisocyanate with an alcohol of the formula $R_1OH$ wherein $R_1$ represents a hydrocarbon group having from 1–18 carbon atoms optionally interrupted by ether groups, wherein the weight ratio of component (1) to component (2) is about 20:1 to 2:1.

13. The composition of claim 12 wherein the weight ratio of component (1) to component (2) is about 15:1 to 8:1.

14. The composition of claim 12 wherein the organic polyurethane composition has a solids content of about 50 to 80 weight percent and additionally contains a pigment.

15. The composition of claim 14 wherein the pigment is aluminum.

16. An organic polyurethane composition having a solids content of about 50 to 90 weight percent which comprises isocyanate-terminated polyurethanes which are prepared by reacting (a) reaction products of the phosgenation of aniline-formaldehyde condensates containing, based on the total weight of component (a), (i) about 0 to 5 weight percent of 2,2'-diphenylmethane diisocyanate, (ii) about 20 to 30 weight percent of 2,4'-diphenylmethane diisocyanate, (iii) about 35 to 50 weight percent of 4,4'-diphenylmethane diisocyanate and (iv) about 30 to 45 weight percent of polymeric isocyanates having 3 or more isocyanate groups; with (b) a polyol component comprising (i) a polyether polyol with an average molecular weight of about 1,000 to 5,000 and which contains at least two hydroxyl groups and at least one tertiary nitrogen atom and which has at least 10 ether groups between the tertiary nitrogen atom and the hydroxyl groups, and optionally (ii) an additional polyol with an average molecular weight of about 1,000 to 5,000 and which contains at least two hydroxyl groups and does not contain a tertiary nitrogen atom, wherein the polyol component (b) contains about 40 to 60 weight percent of component (i) and about 40 to 60 weight percent of component (ii) and wherein the quantities (a) and (b) are chosen to provide an isocyanate content of about 10 to 20 weight percent based on the total weight of components (a) and (b) and a viscosity of about 4,000 to 5,500 cps.

* * * * *